(12) United States Patent
Stewart et al.

(10) Patent No.: US 7,630,364 B2
(45) Date of Patent: Dec. 8, 2009

(54) SECURELY MANAGING NETWORK ELEMENT STATE INFORMATION IN TRANSPORT-LAYER ASSOCIATIONS

(75) Inventors: Randall R. Stewart, Chapin, SC (US); Peter Lei, Arlington Heights, IL (US)

(73) Assignee: Cisco Technology, Inc., San Jose, CA (US)

( * ) Notice: Subject to any disclaimer, the term of this patent is extended or adjusted under 35 U.S.C. 154(b) by 787 days.

(21) Appl. No.: 11/257,820

(22) Filed: Oct. 24, 2005

(65) Prior Publication Data

US 2007/0091902 A1    Apr. 26, 2007

(51) Int. Cl.
H04L 12/28 (2006.01)
H04L 12/56 (2006.01)
G06F 9/00 (2006.01)
G06F 15/16 (2006.01)

(52) U.S. Cl. .................. 370/389; 370/392; 370/401; 726/11; 726/12

(58) Field of Classification Search ............ 370/389, 370/392, 401; 726/11, 12
See application file for complete search history.

(56) References Cited

U.S. PATENT DOCUMENTS

| 2004/0052257 | A1 | 3/2004 | Adbo et al. | |
|---|---|---|---|---|
| 2005/0013280 | A1* | 1/2005 | Buddhikot et al. | 370/349 |
| 2005/0201370 | A1* | 9/2005 | Poyhonen et al. | 370/389 |
| 2005/0265340 | A1* | 12/2005 | Wu et al. | 370/389 |
| 2006/0062203 | A1 | 3/2006 | Satapati | |
| 2006/0164974 | A1 | 7/2006 | Ramalho et al. | |
| 2006/0215654 | A1 | 9/2006 | Sivakumar et al. | |

OTHER PUBLICATIONS

Ong, L. et al., "An Introduction to the Stream Control Transmission Protocol (SCTP)," Network Working Group of the IETF, RFC 3286, May 2002, 9 pages.
Stone, J., et al., "Stream Control Transmission Protocol (SCTP) Checksum Change," Network Working Group of the IETF, RFC 3309, Sep. 2002, 16 pages.
Stewart, R. et al., "Stream Control Transmission Protocol (SCTP) Partial Reliability Extension," Network Working Group of the IETF, RFC 3758, May 2004, 20 pages.
Stewart, R. et al., "Stream Control Transmission Protocol," Network Working Group of the IETF, RFC 2960, Oct. 2000, 120 pages.
Xie, Q., et al., "SCTP NAT Transverse Considerations," IETF Internet-Draft draft-xie-tsvwg-sctp-nat-00.txt, Network Working Group of the IETF, Jul. 9, 2004, pp. 9 pages.

(Continued)

*Primary Examiner*—Chirag G Shah
*Assistant Examiner*—Ashley L Shivers
(74) *Attorney, Agent, or Firm*—Hickman Palermo Truong & Becker LLP

(57) ABSTRACT

Rules in NAT and firewall devices are updated only when a packet flow is verified as genuine through transport-layer message acknowledgment sequences. When a device receives a packet indicating initiation of a new association, the device stores an internal source tag, an internal destination tag, an external source tag, and an external destination tag. Only after receiving a completion acknowledgment message from the destination node, the device sets the internal source tag equal to the external source tag, and sets the internal destination tag equal to the external destination tag. The rules are then updated based on the internal tags. As a result, the approach thwarts denial of service (DOS) attacks that seek to modify rules of NAT and firewall devices to permit harmful traffic.

31 Claims, 13 Drawing Sheets

OTHER PUBLICATIONS

Stewart, R. et al., "Stream Control Transmission Protocol: A Reference Guide," 2002, pp. 231-235, Addison-Wesley, Boston, MA.

Xie, Q., "SCTP NAT Transverse Considerations," slide presentation of Nov. 10, 2004, 5 pages.

U.S. Appl. No. 11/089,721, Notice of Allowance, Notice of Allowability, date mailed Apr. 2, 2008.

Stewart, Randall R., "Stream Control Transmission Protocol (SCTP), A Reference Guide," Addison-Wesley 2002, pp. VII-XX (table of contents), pp. 1-351.

* cited by examiner

SECURELY MANAGING NETWORK ELEMENT STATE INFORMATION IN TRANSPORT-LAYER ASSOCIATIONS

CROSS-REFERENCE TO RELATED APPLICATIONS

The subject matter of this application is generally related to the subject matter of prior application Ser. No. 11/089,721, filed Mar. 25, 2005, and commonly assigned to the assignee hereof.

FIELD OF THE INVENTION

The present invention generally relates to network data communications. The invention relates more specifically to techniques for managing transport-layer protocols across network security devices such as network address translators and firewalls.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Stream Control Transmission Protocol (SCTP) is defined in IETF RFC 2960. This description assumes the reader has familiarity with and understands RFC 2960. SCTP provides protection against modification of messages relating to SCTP associations through the use of data stored in cookies, and through the use of verification tag values. See R. Stewart et al., "Stream Control Transmission Protocol" (Boston: Addison-Wesley, 2001), pp. 231-235.

Network administrators desire to deploy rules governing operation of network address translation (NAT) devices and firewall (FW) devices with a finite duration so that each rule has a lifetime equivalent to the lifetime of an association between endpoints. In present practice, NAT devices and FW devices do not consider the values of SCTP verification tag values. Therefore, rules in NAT and FW devices that are established for SCTP associations can expire only based on timers, administrative action, or configuration. There is a need for a way to cause rules established in NAT devices and FW devices to expire automatically when an SCTP association ends.

One approach to this problem would be to store a verification tag associated with a particular traffic direction of an SCTP association in the NAT device or FW device with each rule. However, this approach is too rigid. In normal operation of SCTP, verification tags of an association sometimes change. For example, if one endpoint of the association restarts, the restarting endpoint normally advertises a changed verification tag value to the other endpoint. Unfortunately, security vulnerability would occur if the NAT device or FW device updated the verification tag stored with association information to match a changed verification tag. In particular, if the NAT device or FW device updated a verification tag based on a spoofed or unauthorized SCTP message, then an attacker could implement a denial-of-service (DoS) attack merely by sending messages with changed verification tag values.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
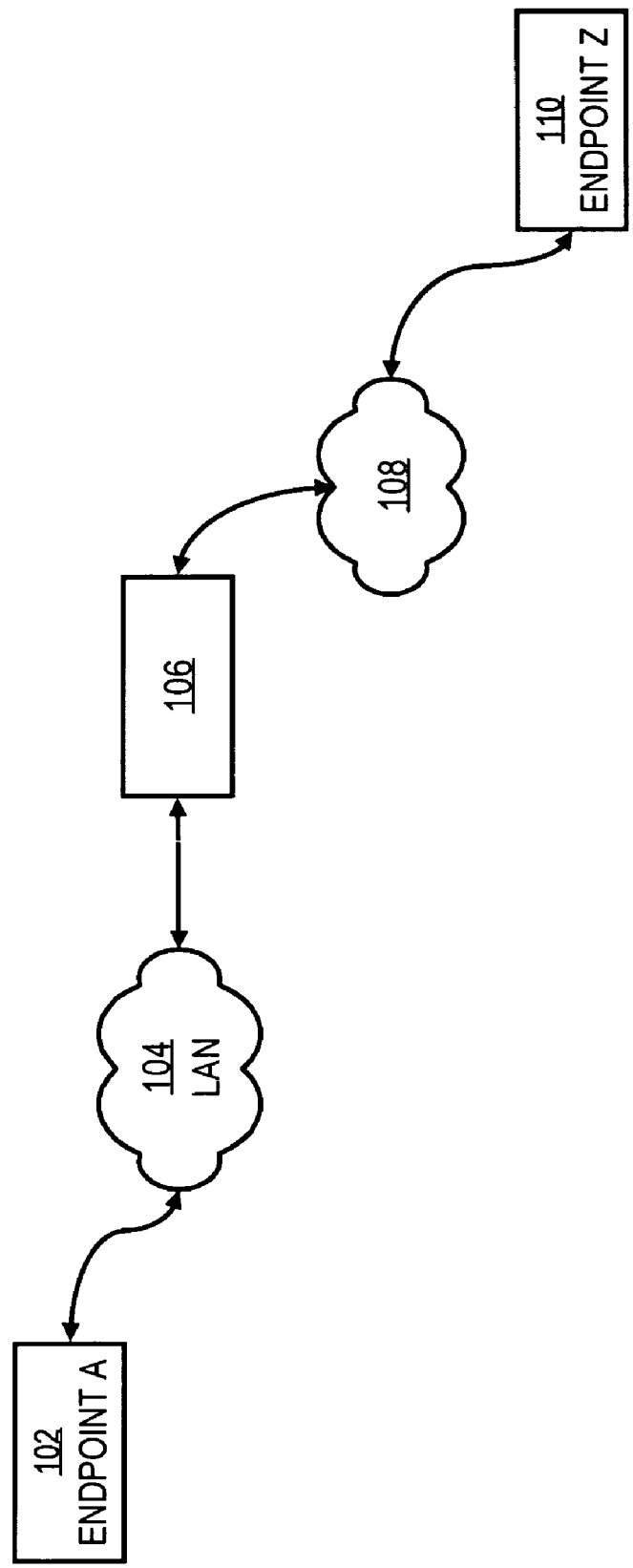
FIG. 1A is a block diagram that illustrates an example network arrangement that may be used to implement an embodiment.

A method and apparatus for securely managing network element state information in transport-layer associations is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Stream Transmission Control Protocol (SCTP) Approach For Managing Network Element State Information
   3.1 Normal INIT with NAT Device
   3.2 INIT Collision with NAT Device
   3.3 Device Restart with NAT
   3.4 Attempted Attack on NAT Device
   3.5 Notes on the Approaches Herein 4.0 Implementation Mechanisms-Hardware Overview 5.0 Extensions and Alternatives

1.0 General Overview

The needs identified in the foregoing Background, and other needs and objects that will become apparent for the following description, are achieved in the present invention, which comprises a method and device that are configured as further described herein.

Generally, in the approach of the invention, rules in NAT and firewall devices are updated only when a packet flow is verified as genuine through transport-layer message acknowledgment sequences. The SCTP protocol defines the use of verification tags (V-tags) for SCTP messages, which comprise one or more "chunks." In the approach herein, a network device such as a NAT or firewall creates an internal source tag, an internal destination tag, an external source tag, and an external destination tag. When the device receives a message or chunk indicating initiation of a new association, the V-tag in the message is stored in one of the external tags. The external tags are used to verify the validity of other messages or chunks that could be sent spuriously by an attacker, such as an ABORT chunk or a shutdown event. Only after receiving a completion acknowledgment message from the destination node, the device sets the internal source tag equal to the external source tag, and sets the internal destination tag equal to the external destination tag. The rules are then updated based on the internal tags.

As a result, the approach thwarts denial of service (DOS) attacks that seek to modify rules of NAT and firewall devices to permit harmful traffic. The approach is robust in the face of INIT collisions and endpoint restarts, as well as DOS attacks.

In one aspect, the invention provides a method for securely managing network element state information in transport-layer associations at a network device that is logically coupled between a source node and a destination node in a telecommunication network, the method comprising the computer-implemented steps of receiving a transport layer protocol initialization packet indicating initiation of a new association; creating and storing, for the new association, an internal source tag, an internal destination tag, an external source tag, and an external destination tag; setting the external destination tag to a first destination value carried in the initialization message; receiving an initialization acknowledgment message and setting the external source tag to a second destination value carried in the initialization acknowledgment message; and only after receiving another acknowledgment message from the destination node, setting the internal source tag equal to the external source tag, and setting the internal destination tag equal to the external destination tag.

According to one feature, the network device is any one device selected from the group consisting of a network address translator, a network address port translator, and a firewall. In another feature, the transport layer protocol is Stream Transmission Control Protocol. In yet another feature, the transport layer protocol is Stream Transmission Control Protocol (SCTP), the transport layer protocol initialization packet is an SCTP INIT packet, the initialization acknowledgment message is an SCTP INIT-ACK packet, and the completion acknowledgment message is an SCTP COOKIE-ACK packet.

In yet another feature, a packet admission rule in the NAT device is updated with the internal source tag and the internal destination tag only after receiving a completion acknowledgment message from the destination node, setting the internal source tag equal to the external source tag, and setting the internal destination tag equal to the external destination tag.

In still another feature, the external source tag and external destination tag are cleared if the initialization acknowledgment message is not received in a specified maximum allowed time. In yet another feature, the external source tag and external destination tag are cleared if the completion acknowledgment message is not received in a specified maximum allowed time.

In another aspect, the invention provides a method, comprising receiving, at a network address translation (NAT) device that is logically coupled between a source node and a destination node in a telecommunication network, a transport layer protocol initialization packet indicating initiation of a new association; creating and storing, for the new association, an internal source tag, an internal destination tag, an external source tag, and an external destination tag; setting the external destination tag to a first destination value carried in the initialization message; forwarding the initialization packet toward the destination node; receiving an initialization acknowledgment message; setting the external source tag to a second destination value carried in the initialization acknowledgment message; forwarding the initialization acknowledgment message toward the source node; and only after receiving a completion acknowledgment message from the destination node, setting the internal source tag equal to the external source tag, and setting the internal destination tag equal to the external destination tag.

In other aspects, the invention encompasses a computer apparatus and a computer-readable medium configured to carry out the foregoing steps. Example apparatus include a network address translator, network address port translator, firewall, etc.

2.0 Structural and Functional Overview

FIG. 1A is a block diagram of an example network arrangement that may be used to implement an embodiment. A first endpoint 102, also termed "endpoint A" herein, is coupled to a local area network (LAN) 104. A network address translation (NAT) or firewall (FW) device 106 (also termed NAT/FW device 106) is coupled to LAN 104 and provides an interface to an external untrusted network 108. The external network 108 may comprise one or more local networks, wide area networks, internetworks, or a combination thereof. A second endpoint 110, also termed "endpoint Z" herein, is coupled to external network 108.

For purposes of illustrating a simple example, FIG. 1 shows two endpoints, one NAT/FW device, and two networks. However, the approaches described herein are broadly applicable to many other contexts. For example, network 104 need not be a LAN, but could be a service provider network, WAN, or any other resource that is protected using NAT/FW device 106. Further, endpoints 102, 110 need not be network end station devices such as workstations, personal computers, servers, etc., but may represent one or more intermediate networking devices in combination with such end stations.

In conventional practice an endpoint located behind a FW/NAT device, such as endpoint A, is assigned a private network address. In networks based on Internet Protocol (IP), the private network address is not publicly routable in the Internet. The FW/NAT device exposes a different, publicly routable network address to external devices. For illustrating a clear example, this description assumes that endpoint A has a private network address of 10.1.1.1 and FW/NAT device 106 uses the address 65.5.1.1 as an external, publicly routable address.

Figure 1B:
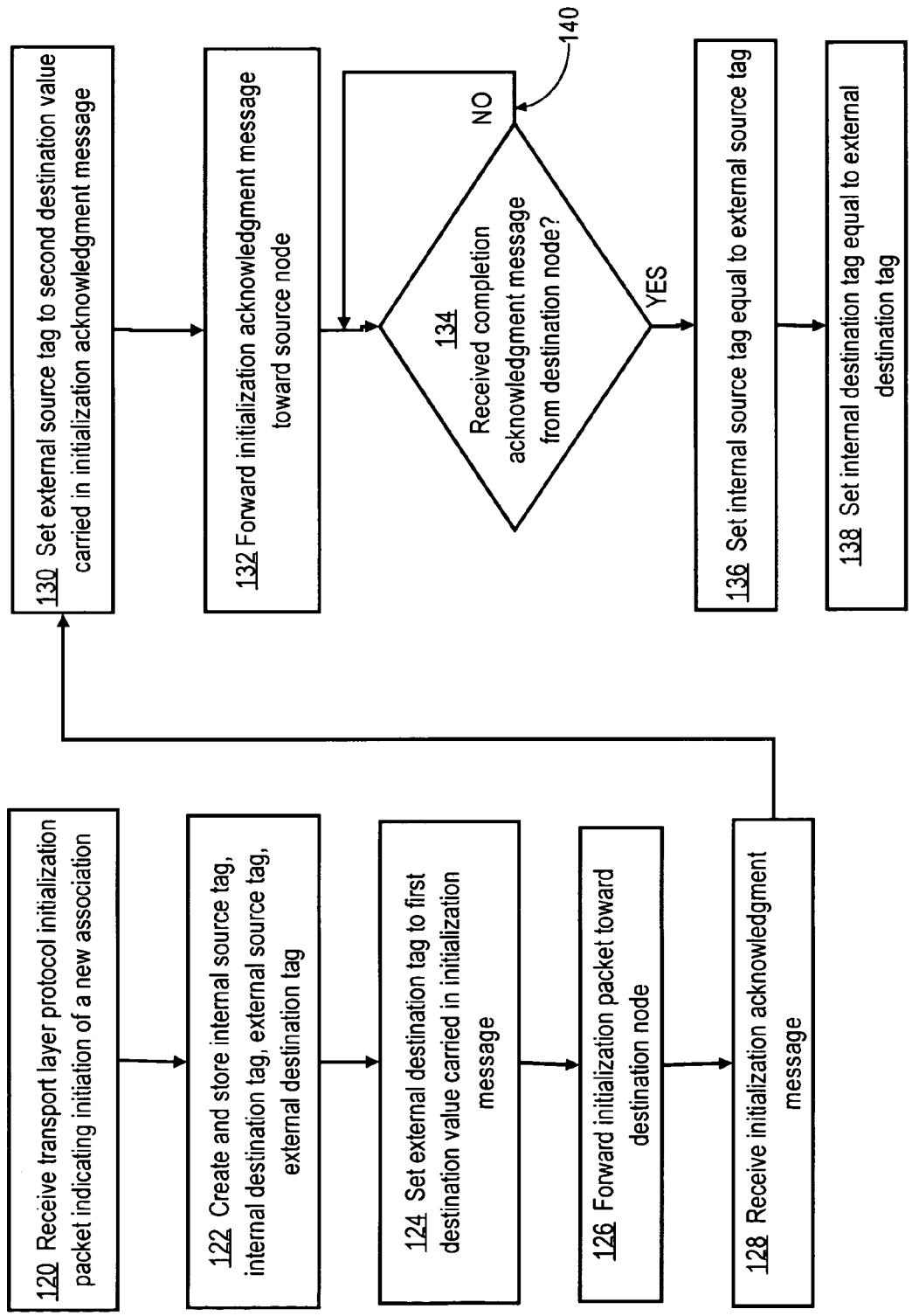
FIG. 1B is a flow diagram that illustrates a high level overview of one embodiment of a method for securely managing network element state information in transport-layer associations.

FIG. 1B is a flow diagram that illustrates a high level overview of one embodiment of a method for updating state information in a network element. The approach of FIG. 1B may be performed, for example, in a FW/NAT device and provides resistance to denial-of-service attacks that seek to modify rules of NAT and firewall devices to permit harmful traffic. The approach also is robust in the face of a crash by the NAT/FW device.

In step 120, a transport layer protocol initialization packet is received. Receiving the packet may occur at a networking device that connects two networks, such as FW/NAT device 106. The packet indicates initiation of a new association of endpoints in the transport layer protocol. Stream Transmission Control Protocol (SCTP) is an example transport layer protocol with which embodiments may be used.

In step 122, the receiving device creates and stores an internal source tag, internal destination tag, external source tag, and external destination tag. The tags are used to store the state of an association between endpoints; however, the tags are organized in a set of internal tags that represent reliable, verified information, and external tags that are exposed to the endpoints temporarily as the receiving device performs verification steps. The use of internal and external tags is described further herein in other sections below. However, in general, the internal tags are used within a protocol stack of the receiving device and therefore the values of the internal tags are modified only when the receiving device determines with confidence that a legitimate source and destination are communicating. Until such confidence is obtained, only the external tag values are exposed to endpoint nodes. At the time of step 122, the receiving device is uncertain whether the initialization message is genuine, and therefore the tag values are considered inchoate or uncommitted.

In step 126, the initialization packet is forwarded towards the destination node. Typically the destination node is within a LAN or other protected network that the receiving device protects. In step 128, an initialization acknowledgment message is received from the destination node. At step 130, the external source tag is set equal to a second destination value that is carried in the initialization acknowledgment message. Thus, once the initialization acknowledgment message is received, the receiving device gains confidence that the initialization process has been started by a legitimate network node.

At step 132, the initialization acknowledgment message is forwarded toward the source node. At step 134, a test is performed to determine if a completion acknowledgment message has been received from the destination node. If not, then the tag values are not modified, as represented by step 140. Waiting continues indefinitely or, optionally, until a specified time period that is selected to prevent denial-of-service conditions from occurring.

At step 136, once a completion acknowledgment message has been received from the destination node, the internal source tag is set equal to the external source tag, and at step 138, the internal destination tag is set equal to the external destination tag. Thus, the receiving device considers the values of the external source and destination tags as authoritative, and adopts them for internal protocol use, only after a completion acknowledgment message is received from the destination node.

The following sections describe a more specific implementation of the preceding general approach.

Figure 2A:
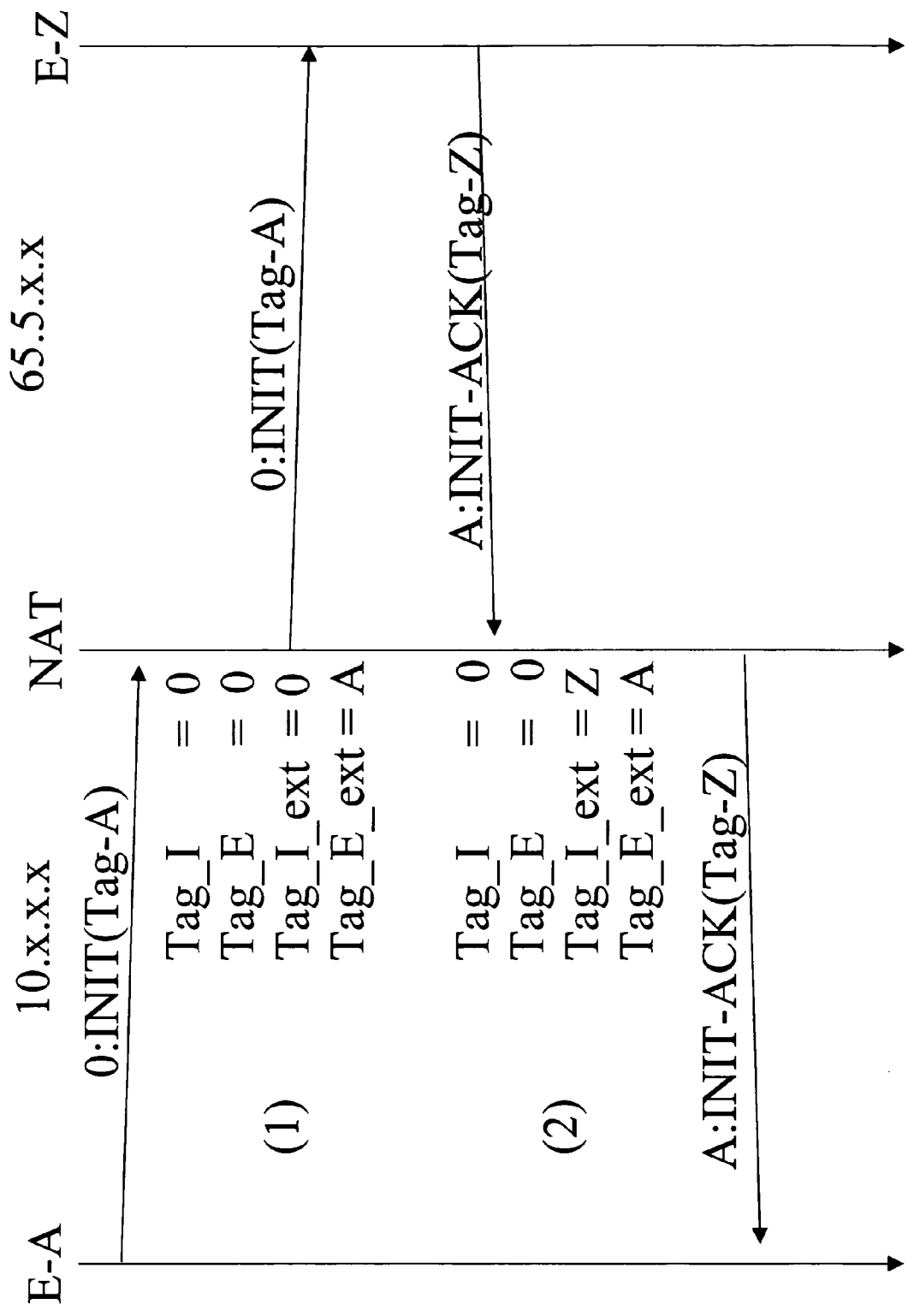
FIG. 2A is an SCTP message flow diagram illustrating a normal INIT with a NAT device.
Figure 2B:
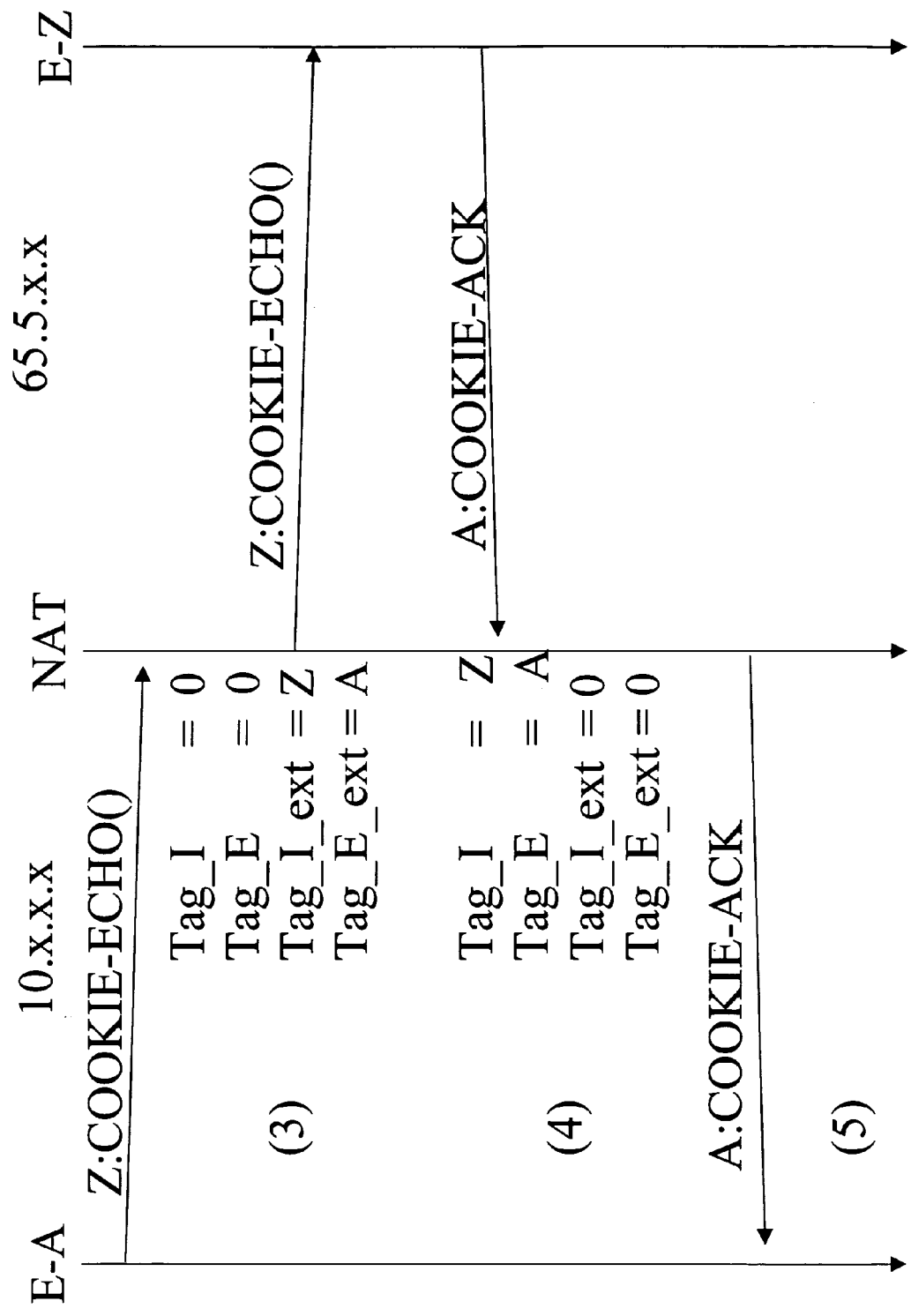
FIG. 2B is a message flow diagram that illustrates further messages in the process of FIG. 2A.

3.0 Stream Transmission Control Protocol (SCTP) Approach for Updating Network Element State Information 3.1 Normal INIT with NAT Device FIG. 2A is an SCTP message flow diagram illustrating a normal INIT transaction with a NAT device; FIG. 2B is a message flow diagram that illustrates further messages in the process of FIG. 2A.

FIG. 2A-5B use the following text notations. E-A means endpoint A. E-Z means endpoint Z. NAT means a network address translator device, which may be a network address port translator or firewall in various embodiments. "10.x.x.x" denotes a private LAN in which devices have IP addresses in the range 10.1.1.1 to 10.255.255.255. "65.5.x.x" denotes a publicly routable network in which devices have addresses in the range 65.5.1.1 to 65.5.255.255. The text "0:WIT(Tag-A)" means an SCTP INIT message originating from an endpoint with the verification tag set to 0 (because for an INIT message SCTP requires the V-tag to be set to 0) carrying an initial tag value of A. Tag_I means internal source tag. Tag_E means internal destination tag. Tag_I_ext means external source tag. Tag_E_ext means external destination tag.

Referring first to FIG. 2A, when the NAT initiates operation, the NAT creates Tag_I, Tag_E, Tag_I_ext, and Tag_E_ext. The NAT sets the values of all such tags to 0 or empty. The state of an association of endpoint A and endpoint Z is set to "not connected."

From behind the NAT, endpoint A sends an INIT message identifying itself toward endpoint Z, which the NAT receives. The NAT performs conventional address and possibly port translation and saves its state values. In particular, at step (1), the NAT sets Tag_I=0, Tag_E=0, Tag_I_ext=0, Tag_E_ext=A. The Tag A of the internal association is saved in the external tag value, not the internal or steady state tag values (Tag_I and Tag_E) that represent authoritative state information for the association. As a result, the approach herein operates correctly when one or more additional INIT messages arrive for an association before the association reaches the established state (INIT collisions).

In an embodiment, a setup timer is started, to ensure that exchanges are completed. In one embodiment, the timer runs for about 20-40 ms, or for about the length required for endpoints to perform a four-way SCTP handshake given then-current network delay, but any timer duration may be selected. The NAT then forwards the INIT message toward Z.

Endpoint Z sends an INIT-ACK message back. As shown by step (2), normal translation occurs back to the internal address. Further, the NAT also verifies that the Tag value of the INIT-ACK message matches either Tag_E or Tag_E_ext. In the case illustrated in FIG. 2A, Tag_e is empty (as denoted by the value 0), so only Tag_E_ext is checked. The Tag Z value received in the INIT-ACK message is stored as the Tag_I_ext value. The NAT then forwards the INIT-ACK message toward endpoint A.

Referring now to FIG. 2B, endpoint A sends a COOKIE-ECHO message toward endpoint Z, and the message is received at the NAT. At step (3), the NAT optionally checks that the Tag_I value is correct by comparison to the Tag_I_Ext value. If no match is found, the COOKIE-ECHO message is discarded. If the match is successful, no state values are updated, but the NAT performs normal address and port translation to a global address, and forwards the COOKIE-ECHO message toward endpoint Z.

Endpoint Z then sends a COOKIE-ACK message toward endpoint A, and the message is received at the NAT. At step (4), when the COOKIE-ACK message arrives the NAT verifies that the tag value carried in the message matches the Tag_E_Ext value. If the tag value does not match, then the message is discarded. Assuming that the tag value matches, receiving a COOKIE-ACK message also indicates that the endpoints have completed a valid message acknowledgment sequence. Therefore, in response, the Ext tag values are transferred to the authoritative internal tag values. Therefore, Tag_I is set equal to the value of Tag_I_Ext, and Tag_E is set equal to Tag_E_Ext. Further, Tag_I_Ext and Tag_E_Ext are reset to empty values. Thus, only receiving a COOKIE-ACK message drives the tag values to an established state and results in storing Tag_I and Tag_E.

In embodiments that are used with protocols other than SCTP, a message equivalent to COOKIE-ACK, indicating that both endpoints have completed a valid handshake for an association, may drive the change in tag values to the established state.

At step (5), the NAT has formed an established connection between the endpoints. For subsequent messages, the NAT performs address translations (and optionally port translation), and may optionally block messages or packets that do not carry the correct tag values. An exception is that new INIT/INIT-ACK sequences, which cause the NAT to store tags in the Tag_I_Ext and Tag_E_Ext values, repeating the preceding procedure. However, in no case are the state values discarded if the tags do not match; this prevents rogue endpoints from destroying valid state information by guessing tag values and spoofing messages that contain the guessed tag values. Further, only messages used for setting up an association are allowed to transition the NAT if only the external tags match; normal data transfer or other control messages are not allowed to pass through the NAT unless the internal tags match.

Further, if an ABORT or SHUTDOWN chunk arrives, the NAT can validate such chunks, and only tear down state values for an association when the verification tag in every chunk of the shutdown sequence matches the authoritative tag values, Tag_I or Tag_E.

3.2 INIT Collision with NAT Device

Figure 3A:
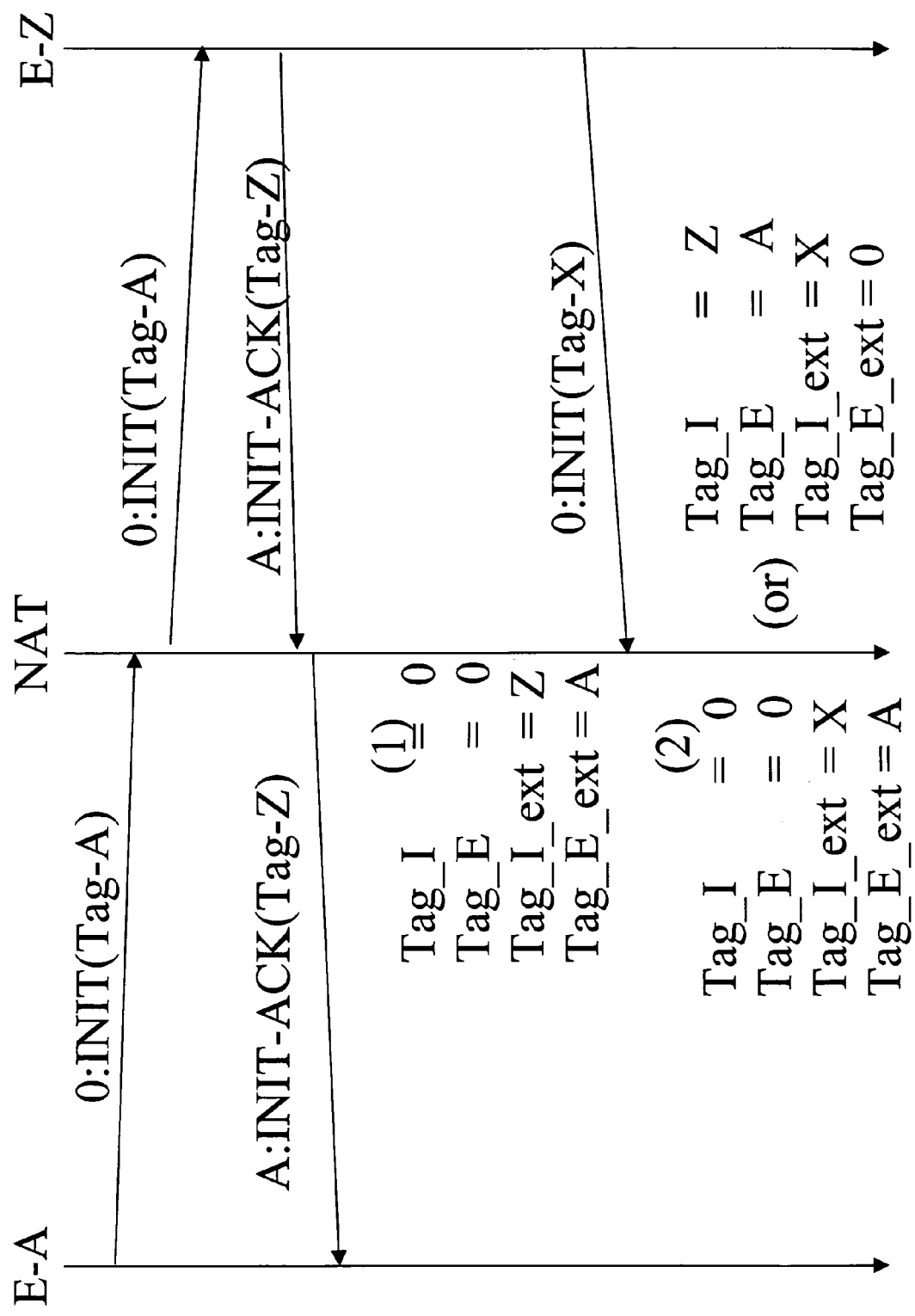
FIG. 3A is an SCTP message flow diagram illustrating an INIT collision with a NAT device.
Figure 3B:
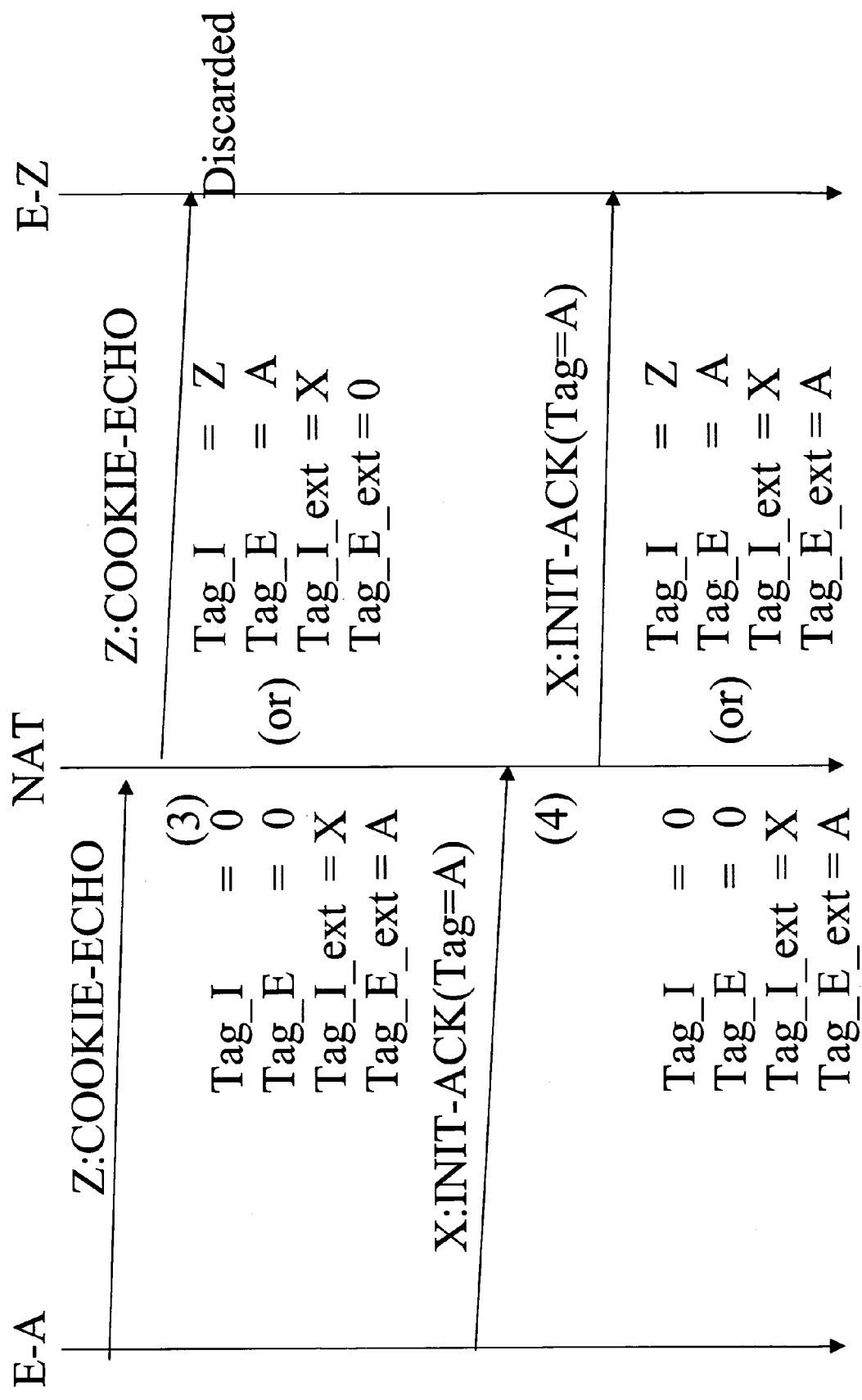
FIG. 3B is a message flow diagram that illustrates further messages in the process of FIG. 3A.
Figure 3C:
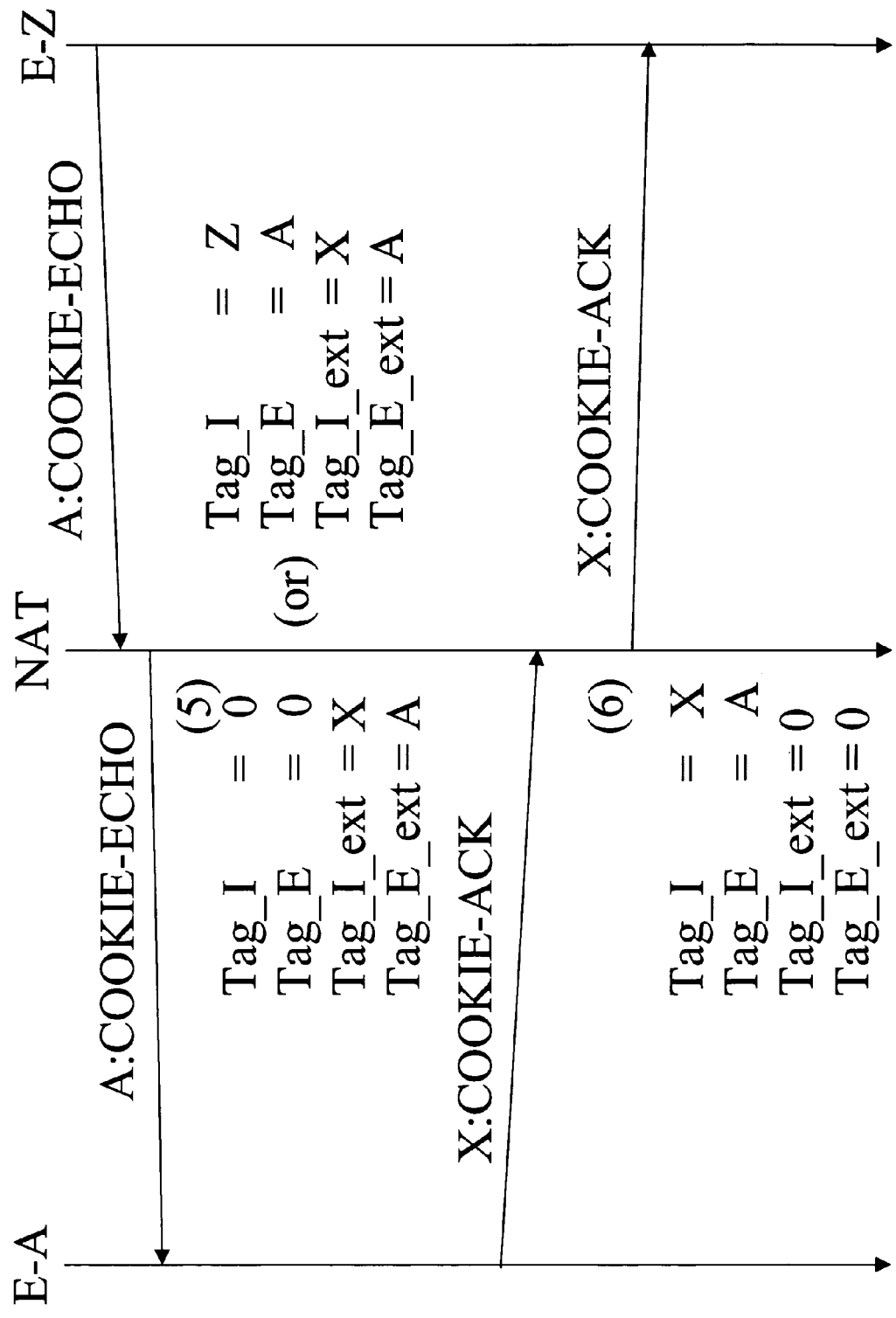
FIG. 3C is a message flow diagram that illustrates further messages in the process of FIG. 3A.

Using the tag values in the preceding manner provides protection for the NAT during a collision of INIT messages. To illustrate an INIT collision scenario, FIG. 3A is an SCTP message flow diagram illustrating an INIT collision with a NAT device, FIG. 3B is a message flow diagram that illustrates further messages in the process of FIG. 3A, and FIG. 3C is a message flow diagram that illustrates further messages in the process of FIG. 3A. Referring first to FIG. 3A, step (1) indicates a point at which all steps in the preceding description of FIG. 2A, FIG. 2B have occurred.

A new INIT message with a different tag value, Tag-X, is then received from endpoint Z. At step (2), in a first alternative, the tag value of X is stored in the Tag_I_Ext value. Optionally, because both Tag_I and Tag_E have empty values, in a second alternative, the previously stored values in Tag_I_Ext and Tag_E_Ext could be moved to Tag_J and Tag_E, as illustrated in FIG. 3A.

Referring now to FIG. 3B, a COOKIE-ECHO message identifying Z is then received from endpoint A. If the first alternative of step (2) is used, then the COOKIE-ECHO message can be discarded, because it carries the wrong tag in comparison to the second INIT that was received. If the second alternative of step (2) is used, then the COOKIE-ECHO message is forwarded to endpoint Z, and endpoint Z will discard the message because the message carries the wrong tags.

Assume that an INIT-ACK message identifying X and carrying Tag=A is then received. At step (4), the NAT forwards the INIT-ACK message to endpoint Z because tag X matches the value of Tag_I_Ext. Further, the value of Tag_E_Ext is updated, regardless of which alternative of step (2) was used.

Referring now to FIG. 3C, assume a COOKIE-ECHO with tag A is received from endpoint Z. At step (5), the tag value of A is accepted, because the value of Tag_E_Ext is A. Therefore, the COOKIE-ECHO message is forwarded to endpoint A.

At step (6), a COOKIE-ACK message with tag X is received. Because the message is a COOKIE-ACK message indicating completion of handshaking between A and Z, and because the tag value X is found in Tag_I_Ext, the values of Tag_I and Tag_E are updated based on Tag_I_Ext and Tag_E_Ext, respectively. Therefore, the values of Tag_I and Tag_E become established and authoritative, while prior messages with incorrect tags have been dropped. The values of Tag_I_Ext and Tag_E_Ext are reset to an empty state.

3.3 Device Restart with NAT

Figure 4A:
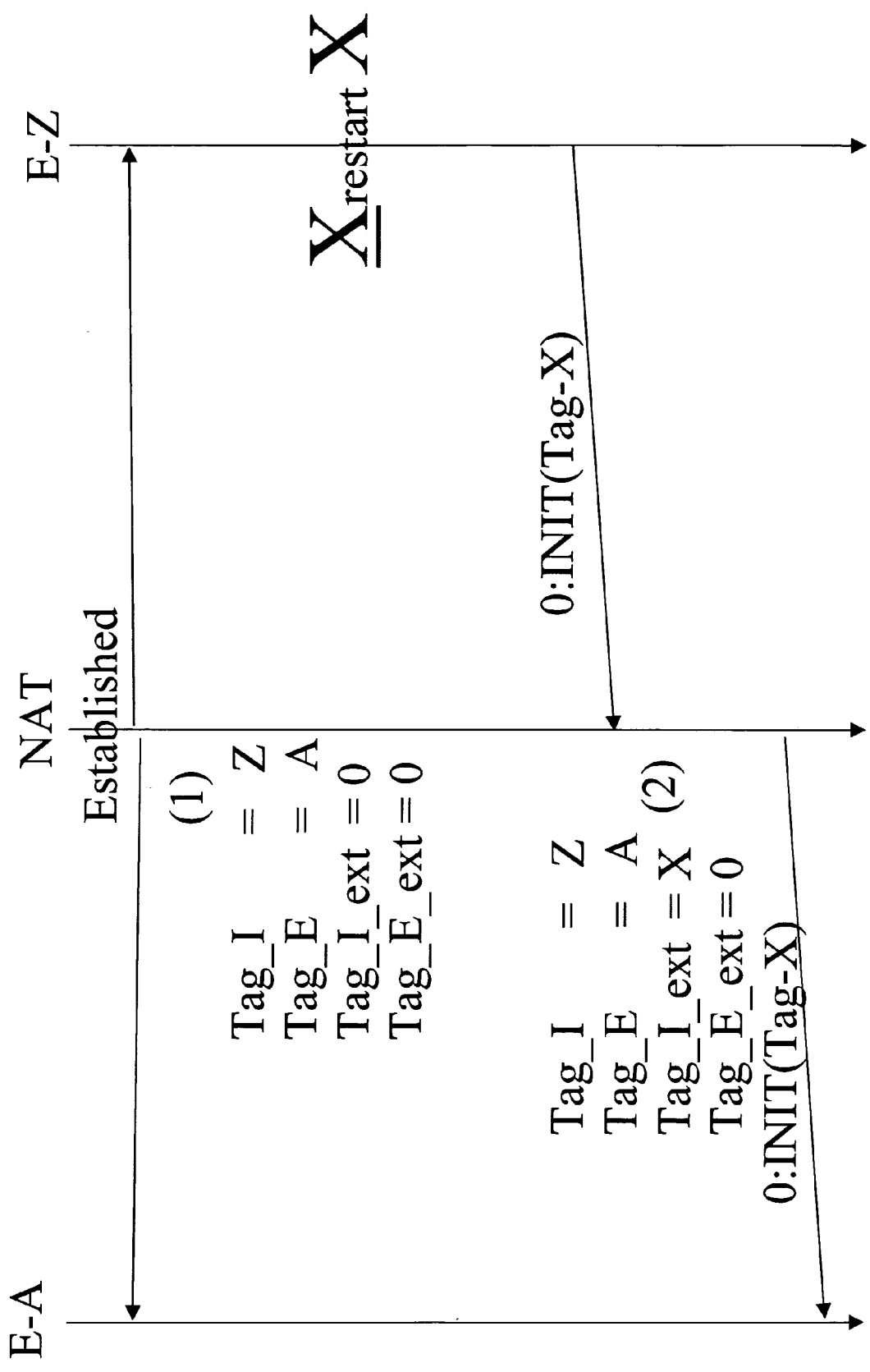
FIG. 4A is an SCTP message flow diagram illustrating a RESTART with a NAT device.
Figure 4B:
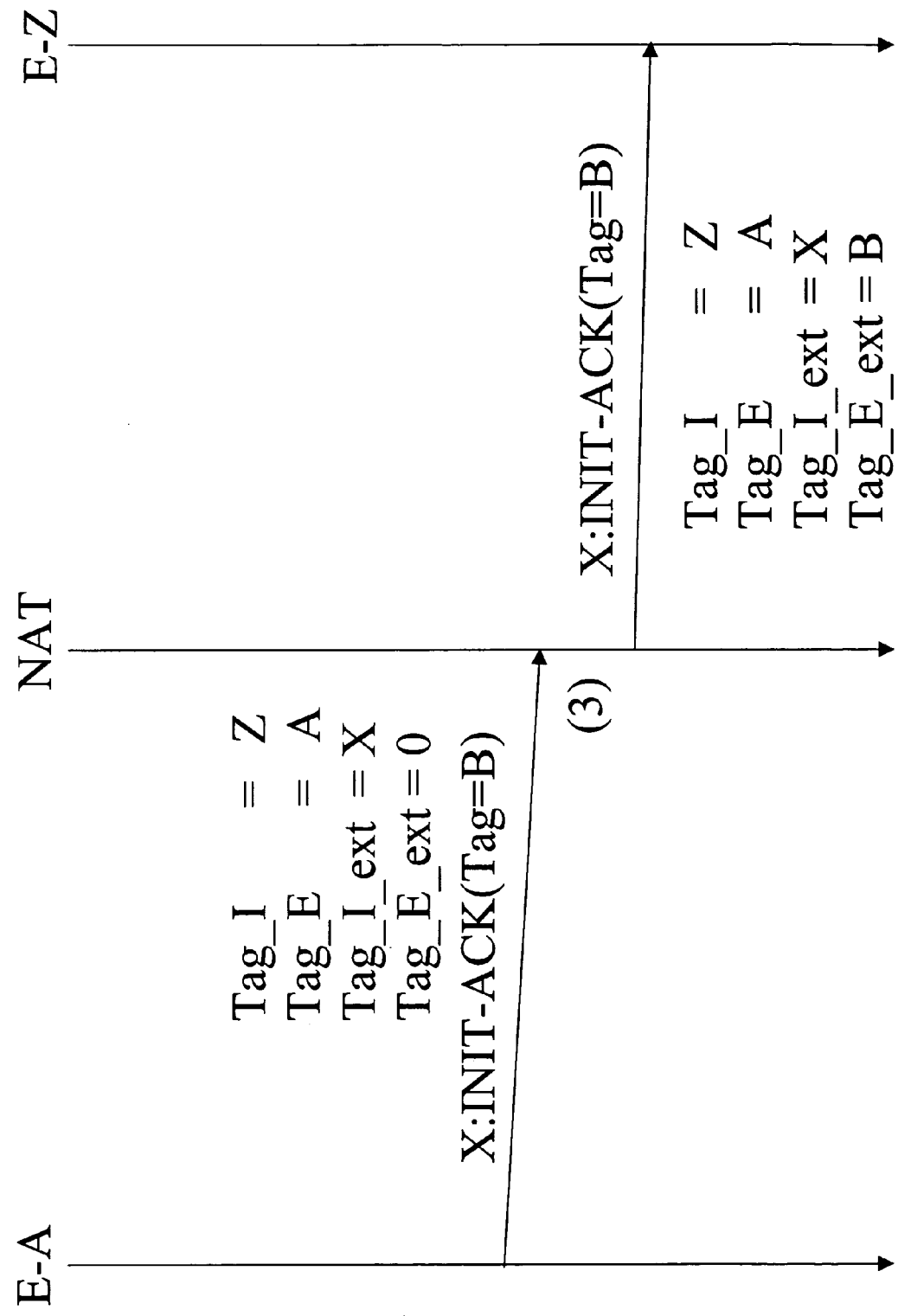
FIG. 4B is an SCTP message flow diagram illustrating an INIT collision with a NAT device after a RESTART as in FIG. 4A.
Figure 4C:
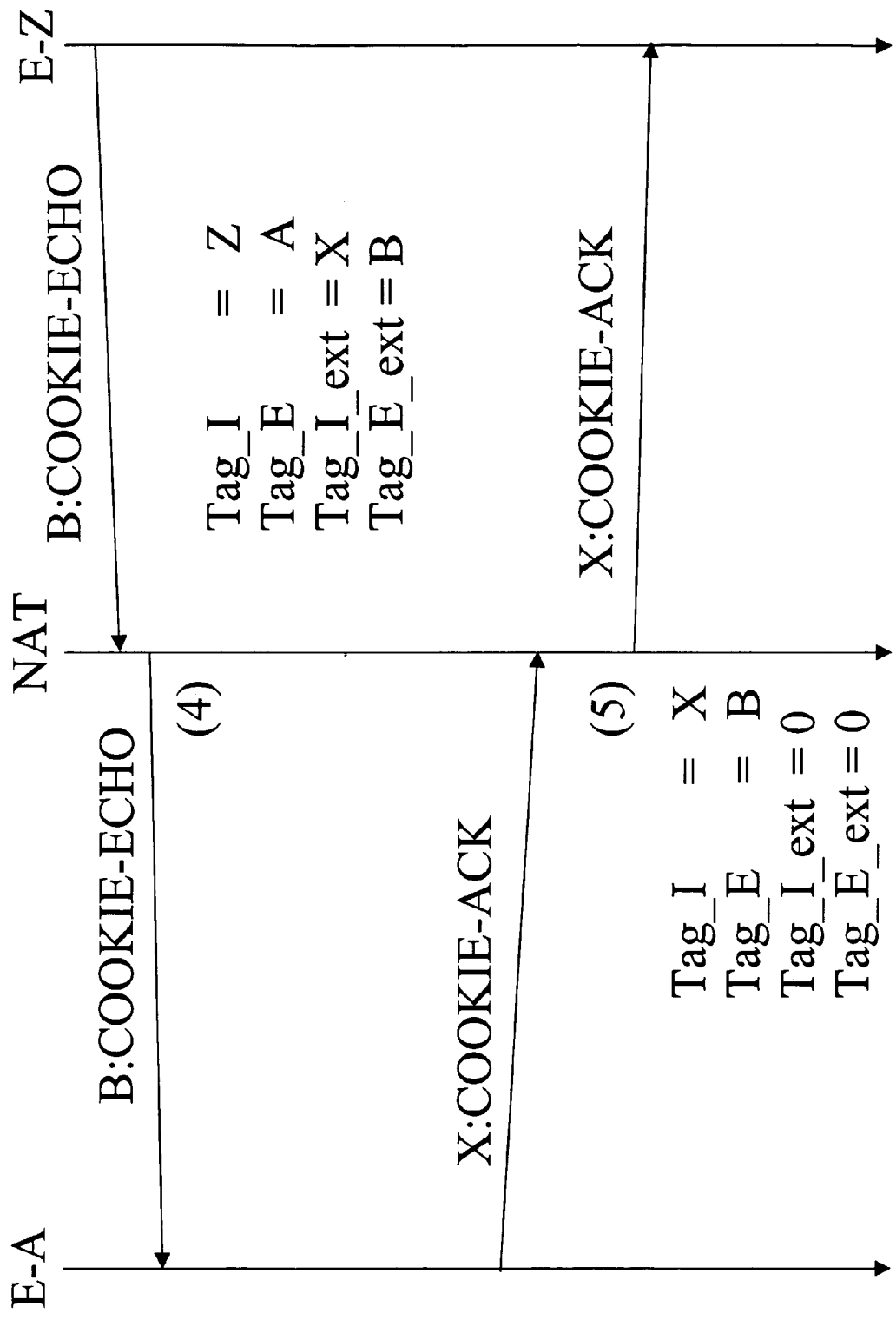
FIG. 4C is a message flow diagram that illustrates further messages in the process of FIG. 4A, FIG. 4B.

FIG. 4A is an SCTP message flow diagram illustrating a RESTART with a NAT device; FIG. 4B is an SCTP message flow diagram illustrating an INIT collision with a NAT device after a RESTART as in FIG. 4A; FIG. 4C is a message flow diagram that illustrates further messages in the process of FIG. 4A, FIG. 4B.

Referring first to FIG. 4A, as indicated by the label "Established," at step (1) the NAT has reached an established state for communications between A and Z. The NAT rejects packets with tag values that do not match Tag_I or Tag_E. Alternatively, the NAT forwards such packets to respective endpoints, while performing address and port translation, and while ignoring packets that attempt to perform shutdown or abort events and that carry incorrect tags.

Assume next that endpoint Z restarts operation. A restart may result from a software or hardware failure, interruption or crash at endpoint Z, or for other reasons. After restarting, endpoint Z attempts to re-establish an association to endpoint A. At step (2), a new INIT message with a different tag has arrived from an endpoint. The value of Tag-X is stored in Tag_I_Ext temporarily, because the NAT cannot yet verify whether the message is valid. A timer is started. If the timer expires, then the values of Tag_I_Ext and Tag_E_Ext are cleared. The INIT message is forwarded to endpoint A with translation, ensuring that the same port values are used.

As seen in FIG. 4B, endpoint A sends an INIT-ACK message with tag X and also carrying Tag=B. At the NAT, the new tag B is stored in Tag_E_Ext because B does not match the value of Tag_I_Ext, as shown at step (3). The NAT then forwards the INIT-ACK message toward endpoint Z.

Referring now to FIG. 4C, at step (4) endpoint Z sends a COOKIE-ECHO message with tag value B, which the NAT forwards to endpoint A because B is found in Tag_E_Ext. At step (5), A replies with a COOKIE-ACK message bearing tag X. Because X is found in Tag_E_Ext, the COOKIE-ACK message is interpreted to validly complete establishment of an association between A and Z, and therefore the NAT moves the values of Tag_I_Ext and Tag_E_Ext into Tag_I and Tag_E, respectively, and resets Tag_I Ext and Tag_E_Ext to empty. The NAT has reached an established state for the association of A and Z.

The preceding message flow illustrates that the approaches herein successfully protect a NAT device and endpoints from spoofed or spurious SCTP messages, while allowing endpoints to resynchronize an association after an endpoint restarts.

3.4 Attempted Attack on NAT Device

Figure 5A:
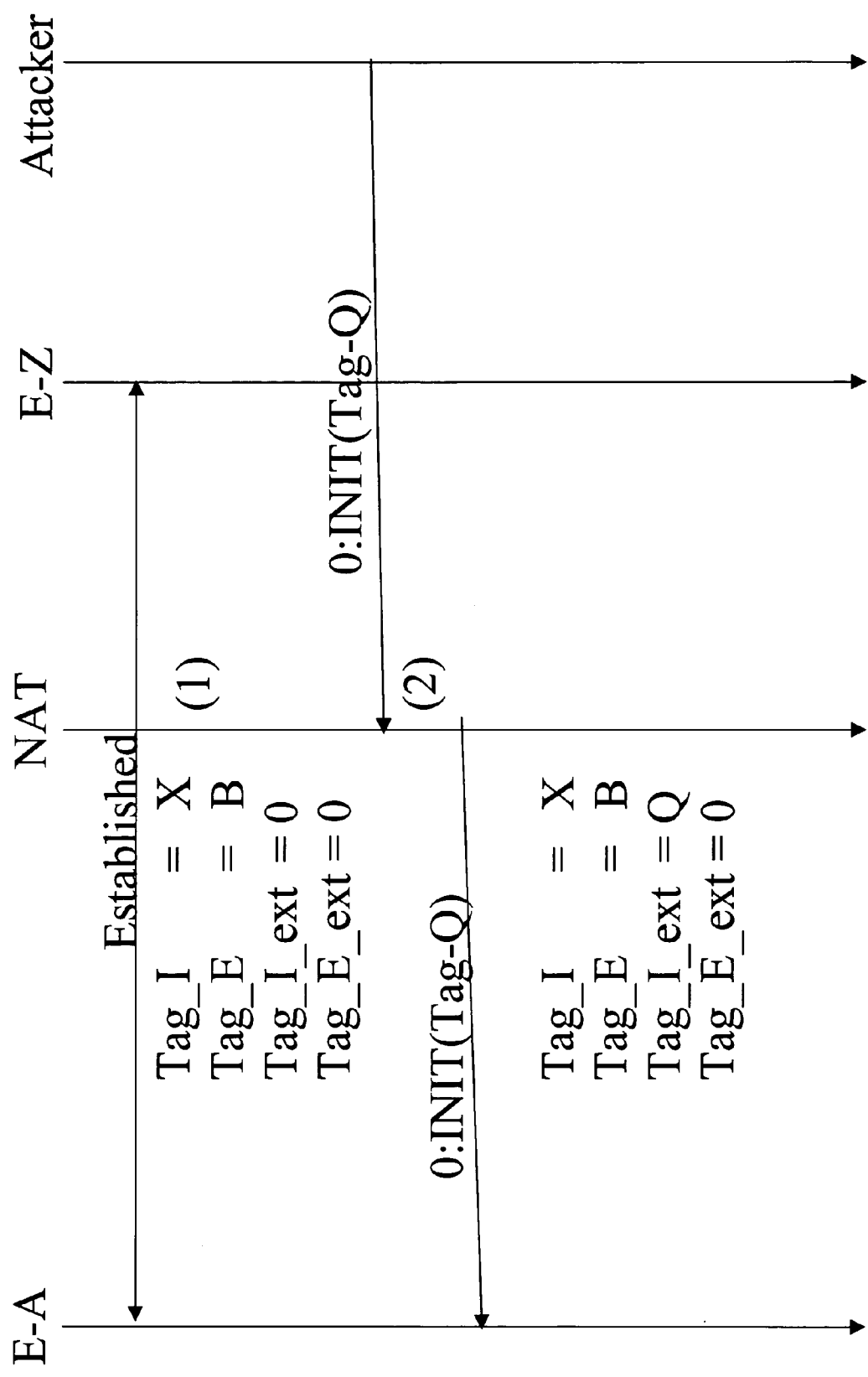
FIG. 5A is an SCTP message flow diagram illustrating an attempted attack on an association flowing through an NAT device.
Figure 5B:
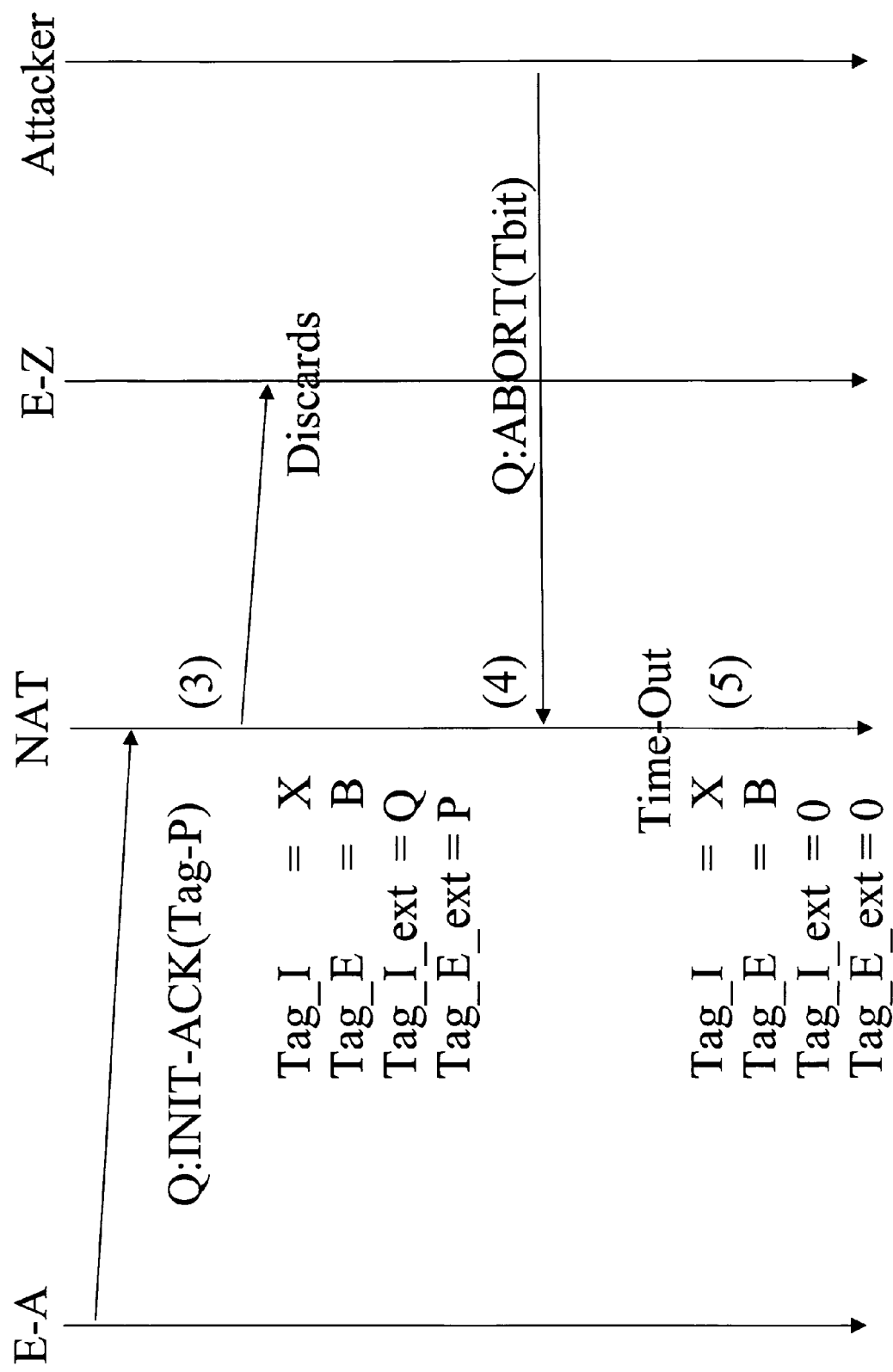
FIG. 5B is a message flow diagram that illustrates further messages in the process of FIG. 5A.

FIG. 5A is an SCTP message flow diagram illustrating an attempted attack on an association flowing through an NAT device; FIG. 5B is a message flow diagram that illustrates further messages in the process of FIG. 5A. Referring first to FIG. 5A, at step (1) endpoints A, Z perform the steps of FIG. 2A, resulting in creating an association with an established state. The stored tag values are X and B, as shown for Tag_I and Tag_E, respectively.

Assume that an attacker sends an INIT message carrying Tag-Q, which is received at the NAT. The NAT stores Q in Tag_I_Ext only, because the NAT cannot verify the validity of Q or the INIT message, and starts a timer. Tag_E_Ext remains empty. The NAT then forwards the INIT message to endpoint A. Because the attacker is not the real endpoint Z, the attacker will never receive any returned INIT-ACK message.

Referring now to FIG. 5B, at step (3), endpoint A generates an INIT-ACK message labeled with Q and carrying a new Tag-P. The NAT stores P in Tag_E_Ext and forwards the INIT-ACK message to endpoint Z. Because endpoint Z has not previously sent an INIT carrying Q, Z discards the INIT-ACK message, as required by the definition of SCTP in RFC 2960.

Assume next that the attacker sends an ABORT message with the T bit set and tagged with Q. Because neither Tag_I nor Tag_E has the value Q, the NAT discards the ABORT message and does not forward the ABORT message to endpoint A. The fact that Q is stored in Tag_I_Ext is immaterial. As a result, the attempted attack is thwarted.

At some point thereafter, the timer expires. The values of Tag_I_Ext and Tag_E_Ext are reset to empty, because the endpoints failed to complete a proper exchange of state setup messages.

In an embodiment, any ABORT message or shutdown-type message that is received with a tag not found in Tag_I or Tag_E is ignored, even when the tag value is present in Tag_I_Ext or Tag_E_Ext. Further, the NAT always starts a timer when an INIT is forwarded, in order to determine whether endpoints properly complete establishing state information for an association. Optionally, the NAT also may drop other data carrying incorrect tags, as defined in the SCTP specification of RFC 2960; however, INIT and INIT-ACK messages are always forwarded subject to the processes described herein. Forwarding INIT and INIT-ACK messages is a minimum step to enable the endpoints to establish an association if possible; in essence the approach copies state information carried in INIT and INIT-ACK messages into temporary locations for the purpose of validating ABORT messages or shutdown sequences. However, only a successful completion of established state, as indicated by a COOKIE-ACK message, results in updating the temporary, Ext tag values to authoritative tag values.

In one embodiment, the validation steps performed herein also may examine the TSNs carried in DATA chunks.

3.5 Notes on the Approaches Herein

The approaches herein prevent an attacker from successfully implementing a denial of service attack against a NAT or endpoint even if the attacker can guess the outer IP address and port value for both endpoints of an association. The use of two sets of tag values in the NAT, combined with monitoring messages that pass through the NAT as part of an association setup sequence, allows NAT rules to exist only for the lifetime of an association, and does not allow an attacker to maliciously modify any of the NAT rules.

In prior approaches, an attacker who has guessed such information can send another INIT chunk with an arbitrary V-tag value and the initial TSN value through the NAT. The attacker could flood the NAT with INIT chunks with arbitrary V-tag values, resulting in a successful denial of service attack. In prior approaches; no V-tag or sequence number protection is provided in SCTP. Further, in prior approaches the NAT has no way to validate the cookie mechanism used by SCTP to address this type of DOS attack, because the contents of cookies are implementation-specific, so that the NAT cannot necessarily understand and use the contents of particular cookies.

Further, if the NAT attempts to implement attack prevention simply by using V-tags, and/or TSNs for DATA chunks, to filter traffic, a new INIT chunk and a subsequent INIT-ACK reply from the peer endpoint would replace the real V-tag and TSN values that are stored in the NAT and used for the true association. Such replacement would prevent traffic from flowing through the NAT.

An IETF internet-draft, the document draft-xie-behave-sctp-nat-cons-00.txt, describes certain issues with SCTP NAT traversal, in the case of both single-homed and multi-homed endpoints. The approaches herein apply to both single-homed and multi-homed endpoints, with respect to a single message flow for an association that is passing through a NAT and that is identified by a particular 4-tuple of source and destination network address values and source and destination port values. It also can be applied to endpoints that make use of a 4-tuple source and destination address in combination with the source and destination v-tags as defined in the IETF internet draft entitled draft-stewart-behave-sctpnat-00.txt.

The approaches herein are useful for any network that uses SCTP for a transport protocol, or a similar transport protocol, and uses a NAT, PAT, NAPT, or firewall device in the network, including service providers, enterprise users, small office users, home office users, home users, etc.

4.0 Implementation Mechanisms—Hardware Overview

Figure 6:
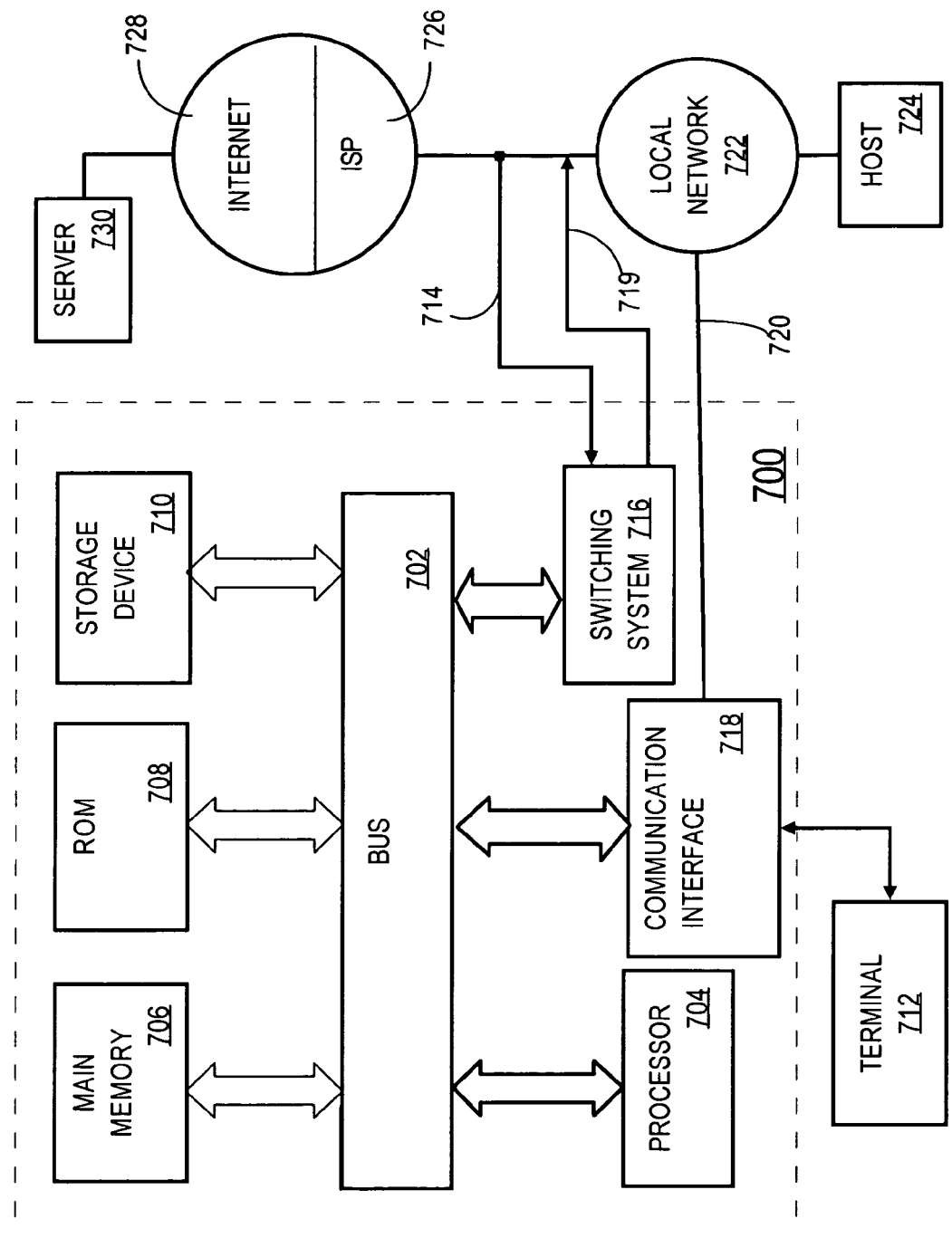
FIG. 6 is a block diagram that illustrates a computer system upon which an embodiment may be implemented.

FIG. 6 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714.

Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for securely managing network element state information in transport-layer associations. According to one embodiment of the invention, securely managing network element state information in transport-layer associations is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for securely managing network element state information in transport-layer associations as described herein.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:

receiving, at a network address translation (NAT) device that is logically coupled between a source node and a destination node in a telecommunication network, a transport layer protocol initialization packet indicating initiation of a new association;

creating and storing, for the new association, an internal source tag, an internal destination tag, an external source tag, and an external destination tag;

setting the external destination tag to a first destination value carried in the initialization packet;

forwarding the initialization packet toward the destination node;

receiving an initialization acknowledgment message;

setting the external source tag to a second destination value carried in the initialization acknowledgment message;

forwarding the initialization acknowledgment message toward the source node; and only after receiving a completion acknowledgment message from the destination node, setting the internal source tag equal to the external source tag, and setting the internal destination tag equal to the external destination tag.

2. A method as recited in claim 1, wherein the transport layer protocol is Stream Transmission Control Protocol.

3. A method as recited in claim 2, wherein the transport layer protocol is Stream Transmission Control Protocol (SCTP), wherein the transport layer protocol initialization packet is an SCTP INIT packet, wherein the initialization acknowledgment message is an SCTP INIT-ACK packet, and wherein the completion acknowledgment message is an SCTP COOKIE-ACK packet.

4. A method as recited in claim 1, wherein a packet admission rule in the NAT device is updated with the internal source tag and the internal destination tag only after receiving the completion acknowledgment message from the destination node, setting the internal source tag equal to the external source tag, and setting the internal destination tag equal to the external destination tag.

5. A method as recited in claim 1, wherein the external source tag and external destination tag are cleared if the initialization acknowledgment message is not received in a specified maximum allowed time.

6. A method as recited in claim 1, wherein the external source tag and external destination tag are cleared if the completion acknowledgment message is not received in a specified maximum allowed time.

7. A method of managing network element state information at a network device that is logically coupled between a source node and a destination node in a telecommunication network, the method comprising the computer-implemented steps of:

receiving a transport layer protocol initialization packet indicating initiation of a new association;

creating and storing, for the new association, an internal source tag, an internal destination tag, an external source tag, and an external destination tag;

setting the external destination tag to a first destination value carried in the initialization packet;

receiving an initialization acknowledgment message and setting the external source tag to a second destination value carried in the initialization acknowledgment message; and only after receiving a completion acknowledgment message from the destination node, setting the internal source tag equal to the external source tag, and setting the internal destination tag equal to the external destination tag;

wherein the steps of the method are performed by the network device.

8. A method as recited in claim 7, wherein the network device is any one device selected from the group consisting of a network address translator, a network address port translator, and a firewall.

9. A method as recited in claim 7, wherein the transport layer protocol is Stream Transmission Control Protocol.

10. A method as recited in claim 9, wherein the transport layer protocol is Stream Transmission Control Protocol (SCTP), wherein the transport layer protocol initialization packet is an SCTP INIT packet, wherein the initialization acknowledgment message is an SCTP INIT-ACK packet, and wherein the completion acknowledgment message is an SCTP COOKIE-ACK packet.

11. A method as recited in claim 7, wherein a packet admission rule in the network device is updated with the internal source tag and the internal destination tag only after receiving the completion acknowledgment message from the destination node, setting the internal source tag equal to the external source tag, and setting the internal destination tag equal to the external destination tag.

12. A method as recited in claim 7, wherein the external source tag and external destination tag are cleared if the initialization acknowledgment message is not received in a specified maximum allowed time.

13. A method as recited in claim 7, wherein the external source tag and external destination tag are cleared if the completion acknowledgment message is not received in a specified maximum allowed time.

14. A network packet routing device that is logically coupled between a source node and a destination node in a telecommunication network, comprising:

one or more processors;

one or more network interfaces that are communicatively coupled both to the one or more processors and to the telecommunication network for receiving packet flows therefrom;

a computer-readable volatile or non-volatile medium comprising one or more sequences of instructions which, when executed by the one or more processors, cause the one or more processors to perform the steps of:

receiving a transport layer protocol initialization packet indicating initiation of a new association;

creating and storing, for the new association, an internal source tag, an internal destination tag, an external source tag, and an external destination tag;

setting the external destination tag to a first destination value carried in the initialization packet;

receiving an initialization acknowledgment message and setting the external source tag to a second destination value carried in the initialization acknowledgment message; and only after receiving a completion acknowledgment message from the destination node, setting the internal source tag equal to the external source tag, and setting the internal destination tag equal to the external destination tag.

15. A device as recited in claim 14, wherein the network packet routing device is any one device selected from the group consisting of a network address translator, a network address port translator, and a firewall.

16. A device as recited in claim 14, wherein the transport layer protocol is Stream Transmission Control Protocol.

17. A device as recited in claim 16, wherein the transport layer protocol is Stream Transmission Control Protocol (SCTP), wherein the transport layer protocol initialization packet is an SCTP INIT packet, wherein the initialization acknowledgment message is an SCTP INIT-ACK packet, and wherein the completion acknowledgment message is an SCTP COOKIE-ACK packet.

18. A device as recited in claim 14, wherein a packet admission rule in the network packet routing device is updated with the internal source tag and the internal destination tag only after receiving the completion acknowledgment message from the destination node, setting the internal source tag equal to the external source tag, and setting the internal destination tag equal to the external destination tag.

19. A device as recited in claim 14, wherein the external source tag and external destination tag are cleared if the initialization acknowledgment message is not received in a specified maximum allowed time.

20. A device as recited in claim 14, wherein the external source tag and external destination tag are cleared if the completion acknowledgment message is not received in a specified maximum allowed time.

21. A network packet routing device that is logically coupled between a source node and a destination node in a telecommunication network, comprising:
   one or more processors;
   one or more network interfaces that are communicatively coupled both to the one or more processors and to the telecommunication network for receiving packet flows therefrom;
   means for receiving a transport layer protocol initialization packet indicating initiation of a new association;
   means for creating and storing, for the new association, an internal source tag, an internal destination tag, an external source tag, and an external destination tag;
   means for setting the external destination tag to a first destination value carried in the initialization packet;
   means for receiving an initialization acknowledgment message and setting the external source tag to a second destination value carried in the initialization acknowledgment message; and
   means for setting the internal source tag equal to the external source tag, and setting the internal destination tag equal to the external destination tag only after receiving a completion acknowledgment message from the destination node.

22. A device as recited in claim 21, wherein the network packet routing device is any one device selected from the group consisting of a network address translator, a network address port translator, and a firewall.

23. A device as recited in claim 21, wherein the transport layer protocol is Stream Transmission Control Protocol.

24. A device as recited in claim 23, wherein the transport layer protocol is Stream Transmission Control Protocol (SCTP), wherein the transport layer protocol initialization packet is an SCTP INIT packet, wherein the initialization acknowledgment message is an SCTP INIT-ACK packet, and wherein the completion acknowledgment message is an SCTP COOKIE-ACK packet.

25. A device as recited in claim 21, wherein a packet admission rule in the network packet routing device is updated with the internal source tag and the internal destination tag only after receiving the completion acknowledgment message from the destination node, setting the internal source tag equal to the external source tag, and setting the internal destination tag equal to the external destination tag.

26. A device as recited in claim 21, wherein the external source tag and external destination tag are cleared if the initialization acknowledgment message is not received in a specified maximum allowed time.

27. A device as recited in claim 21, wherein the external source tag and external destination tag are cleared if the completion acknowledgment message is not received in a specified maximum allowed time.

28. A method as recited in claim 1, wherein a subsequently received message is dropped when the subsequently received message is unrelated to setting up an association and comprises a verification tag that does not match either the internal source tag or the internal destination tag.

29. A method as recited in claim 7, wherein a subsequently received message is dropped when the subsequently received message is unrelated to setting up an association and comprises a verification tag that does not match either the internal source tag or the internal destination tag.

30. A device as recited in claim 14, wherein a subsequently received message is dropped when the subsequently received message is unrelated to setting up an association and comprises a verification tag that does not match either the internal source tag or the internal destination tag.

31. A device as recited in claim 21, wherein a subsequently received message is dropped when the subsequently received message is unrelated to setting up an association and comprises a verification tag that does not match either the internal source tag or the internal destination tag.

* * * * *

UNITED STATES PATENT AND TRADEMARK OFFICE
CERTIFICATE OF CORRECTION

PATENT NO. : 7,630,364 B2 Page 1 of 1
APPLICATION NO. : 11/257820
DATED : December 8, 2009
INVENTOR(S) : Stewart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Twenty-first Day of December, 2010

David J. Kappos
*Director of the United States Patent and Trademark Office*